US007318177B2

(12) United States Patent
Ogle et al.

(10) Patent No.: US 7,318,177 B2
(45) Date of Patent: *Jan. 8, 2008

(54) METHODS, SYSTEMS AND COMPUTER PROGRAM PRODUCTS FOR COMPONENT MONITORING/ANALYSIS UTILIZING A SITUATIONAL REPRESENTATION OF COMPONENT STATUS

(75) Inventors: David M. Ogle, Cary, NC (US); Balachandar Rajaraman, Morrisville, NC (US); Abdolreza Salahshour, Raleigh, NC (US); John W. Sweitzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 732 days.

This patent is subject to a terminal disclaimer.

(21) Appl. No.: 10/600,786

(22) Filed: Jun. 20, 2003

(65) Prior Publication Data
US 2005/0004769 A1    Jan. 6, 2005

(51) Int. Cl.
*G06F 11/00* (2006.01)
*G06F 3/00* (2006.01)

(52) U.S. Cl. .......................................... 714/47; 714/39
(58) Field of Classification Search ................. 714/47, 714/37, 39, 48, 38, 40; 710/15
See application file for complete search history.

(56) References Cited

U.S. PATENT DOCUMENTS

| | | | | |
|---|---|---|---|---|
| 6,167,538 | A * | 12/2000 | Neufeld et al. | 714/47 |
| 6,470,464 | B2 * | 10/2002 | Bertram et al. | 714/37 |
| 6,751,753 | B2 * | 6/2004 | Nguyen et al. | 714/39 |
| 6,889,264 | B2 * | 5/2005 | Clough et al. | 710/15 |

* cited by examiner

*Primary Examiner*—Shelly Chase
*Assistant Examiner*—Fritz Alphonse
(74) *Attorney, Agent, or Firm*—Stevens & Showalter LLP

(57) ABSTRACT

Monitoring components of a system is provided by associating status of at least one component of the system with one of a set of component independent predefined situation categories to provide the status of the component in a common situation format that includes the associated component independent predefined situation category. Status of the system is analyzed based on the common situation format representation of the component status.

29 Claims, 6 Drawing Sheets

METHODS, SYSTEMS AND COMPUTER PROGRAM PRODUCTS FOR COMPONENT MONITORING/ANALYSIS UTILIZING A SITUATIONAL REPRESENTATION OF COMPONENT STATUS

FIELD OF THE INVENTION

The present invention relates to networks and more particularly to monitoring and/or analysis of network components.

BACKGROUND OF THE INVENTION

Information Technology (IT) systems, methods and computer program products, including, for example, computer networks, have grown increasingly complex with the use of distributed client/server applications, heterogeneous platforms and multiple protocols all on a single physical backbone. The control of traffic on networks is likewise moving from centralized information systems departments to distributed work groups. The growing utilization of computer networks is not only causing a move to new, high speed technologies, but is, at the same time, making the operation of computer networks more critical to day to day business operations. Furthermore, as computer systems become more distributed and, thereby, more inter-related, the number of different components of a system that may result in problems increases. For example, application integration, including integration across heterogeneous systems, has increased the complexity of systems and the interdependence of systems while also increasing reliance on such systems for example, for mission critical applications.

This increase in the complexity of systems may make problem determination and/or resolution more complex. In conventional systems, components, such as applications, middleware, hardware devices and the like, generate data that represents the status of the component. This component status data will, typically, be consumed by some management function utilized to monitor the system and/or for problem analysis/resolution. The management function may, for example, be a user reading a log file or it may be a management application that is consuming the data for analysis and/or display. In conventional systems, component and component owners are responsible for determining what data is provided, in terms of format, completeness and/or order of the data as well as the meaning of the data.

Such an ad hoc approach to component status information may be convenient for the component developer, however, the complexity of the management function may be increased. For example, the management function, may need some context for a status message from the component. In particular, the management function will, typically, need to know what a data message from a component represents, the format of the data, the meaning of the data and what data is available. For example, the management function may need to know that a particular message (e.g., message "123"), from a particular component (e.g., component "ABC") has a certain number of fields (e.g., three fields) and what data is in each of the fields (e.g., a first field is a timestamp, a second field is a queue name and third field is a value for the queue name). Typically, no data other than the data provided by the component can be derived from the management system. Furthermore, this approach also assumes that the consumer of the data knows, not only the significance of the data fields, but also the format of the fields (e.g., the timestamp is in the mm/dd/yy format).

Furthermore, the cause of the problem that is reported by an error message may be reported by a component other than the component with the problem. Thus, a management function may need to know, not only the existence of the component, but the relationship between the components that are managed. Without such knowledge, the management function may not recognize that the source of the component is not the component reporting the error.

One difficulty that may arise from the use of differing component status formats is in the analysis of problems for differing components or from different versions of a component. Knowledge bases have conventionally been used to map component status data, such as error log messages, that are reported by components to symptoms and eventually to fixes for problems. For example, there are symptom databases utilized by International Business Machines Corporation, Armonk, N.Y., that map WebSphere error log messages to symptoms and fixes. These databases typically work on the assumption that if you see a specified error message (e.g., message "123") from a specified component (e.g., component "XYZ"), then a particular symptom is occurring (e.g., the performance is slow) and a predefined remedy (e.g., increase the parameter "buffsize" to 10) will likely fix the problem.

One problem with mapping error messages or combinations of error messages to symptoms and fixes is that such a mapping typically associates specific, component dependent, error messages to specific, component dependent, fixes. Thus, for example, if a new release of a product is released, the symptom database may need to be rewritten or modified to take into account all the new messages. This approach does not lend itself to creating cross-product or cross-component symptom databases as each message for each product must, typically, be known in order to create the symptom database.

SUMMARY OF THE INVENTION

Embodiments of the present invention provide methods, systems and computer program products for monitoring components of a system by associating status of at least one component of the system with one of a set of component independent predefined situation categories to provide the status of the component in a common situation format that includes the associated component independent predefined situation category. Status of the system is analyzed based on the common situation format representation of the component status.

In particular embodiments of the present invention, the status of the component is associated with a situation category by the component. Alternatively, the situation category may be associated with the component by obtaining a status message from a component and classifying the status message based on the contents of the status message so as to identify the predefined situation category. A common situation format representation of the status message may be generated based on the identified category.

In further embodiments of the present invention, a source of the status message and a component associated with the status message are determined. Generating a common situation format representation of the status message based on the identified category is provided by generating a common situation format representation of the status message that includes an identification of the source of the status message, an identification of the component associated with the status message and the identified category.

In yet other embodiments of the present invention, analyzing status of the system includes generating a common situation format representation of the status of the system based on the common situation format representation of the component status.

In additional embodiments of the present invention, analyzing status of the system includes obtaining common situation format representations of status of other components of the system. Correlations are determined between the obtained common situation format representations and the common situation format representation of the status of the component. Status of the system is determined based on sufficiently correlated ones of the obtained common situation format representations and the common situation format representation of the status of the at least one component. The correlations may be determined by time correlation and/or transaction correlation.

Furthermore, status of the system may be determined by evaluating the sufficiently correlated common situation format representations so as to select one of the set of predefined situation categories based on the sufficiently correlated common situation format representations. A common situation format representation that includes the selected one of the component independent predefined situation categories may also be generated. Generation of the common situation format representation that includes the selected one of the component independent predefined situation categories may include determining a component identifier for the common situation format representation that includes the selected one of the predefined situation categories based on component identifiers associated with the correlated ones of the obtained common situation format representations and the common situation format representation of the status of the at least one component. Such a determination may include aggregating the component identifiers to identify a higher level abstraction component identifier corresponding to the component identifiers and/or isolating one of the component identifiers so as to provide the component identifier for the generated common situation format representation.

In still further embodiments of the present invention, analyzing the status of the system includes automatically identifying corrective action based on the sufficiently correlated common situation format representations. Automatically identifying corrective action may also include generating a common action format representation of the identified corrective action.

In yet additional embodiments of the present invention, analysis of the status of the system includes automatically identifying corrective action based on the analysis of the status of the system which may include generating a common situation format representation of the identified corrective action. The common situation format representation of the identified corrective action may include a canonical representation of the corrective action.

In other embodiments of the present invention, methods, systems and/or computer program products are provided for generating status information for a component. Component specific status information for the component is obtained and classified so as to identify one of a set of component independent predefined situation categories based on the status information. A common situation format representation of the status information is generated based on the identified category.

In further embodiments of the present invention, a source of the status information and a component associated with the status information are determined. Generation of a common situation format representation of the status information based on the identified category includes generating a common situation format representation of the status information that includes an identification of the source of the status message, an identification of the component associated with the status message and the identified category.

In particular embodiments of the present invention, determination of a source of the status information is based on an explicit identification of the source of the status information. Determination of a source of the status information could also be based on an implicit identification of the source of the status information. Additionally, the identification of the source may be included in the common situation format representation by appending the source component identification information to the common situation format representation.

In particular embodiments of the present invention, determination of a component associated with the status information is based on an explicit identification of the component associated with the status information. Determination of the component associated with the status information could also be based on an implicit identification of the component associated with the status information. Additionally, the identification of the component associated with the status information may be included in the common situation format representation by appending the component identification information of component associated with the status information to the common situation format representation.

In yet other embodiments of the present invention, obtaining component specific status information for the component, classifying the status information so as to identify the one of a set of component independent predefined situation categories based on the status information and generating a common situation format representation of the status information based on the identified category are carried out by the component. Obtaining component specific status information for the component, classifying the status information so as to identify the one of a set of component independent predefined situation categories based on the status information and generating a common situation format representation of the status information based on the identified category could also be carried out by an adapter that obtains information about the component.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
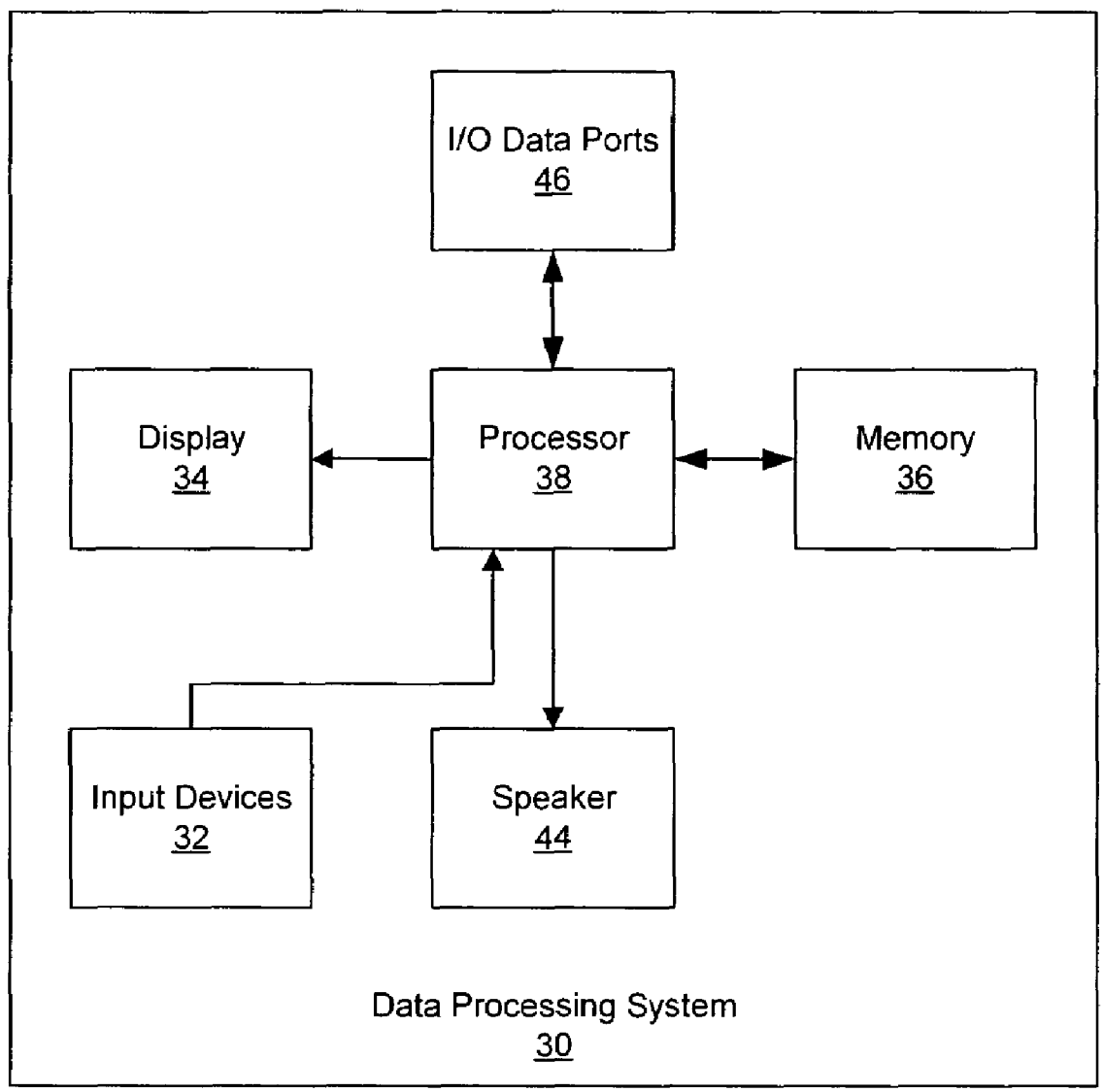
FIG. 1 is a block diagram of a data processing system suitable for use in a system according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for and/or use a common situation format representation of component and/or system status. The common situation format may provide for the characterization of component and/or system status as one of a predefined set of categories of situations and, thereby, provide device independent status information. Thus, analysis of the status of a component and/or a system may be based on the predefined categories of information and, therefore, may be made substantially independent of the component specific error reporting of individual components.

Various embodiments of the present invention will now be described with reference to the figures. FIG. 1 illustrates an exemplary embodiment of a data processing system 30 suitable for conversion of component status and/or analysis of component status in accordance with embodiments of the present invention. The data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
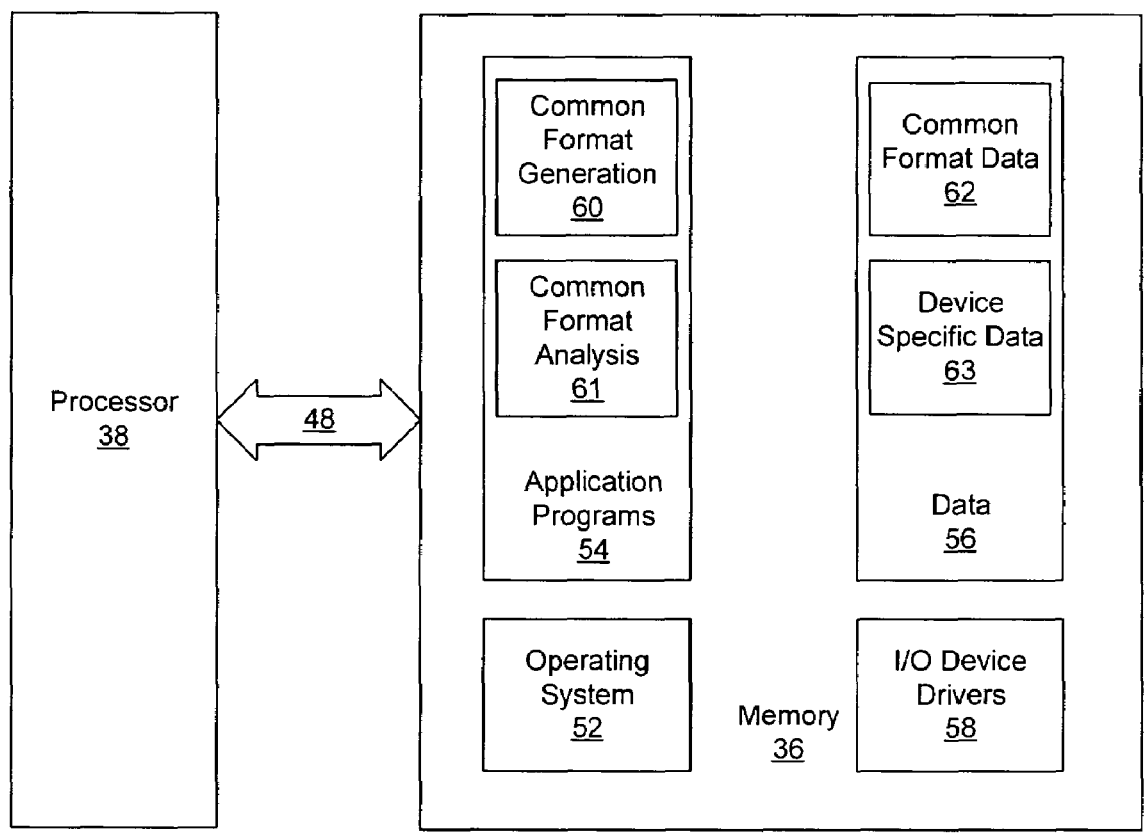
FIG. 2 is a more detailed block diagram of a system utilizing a situational representation of component status according to embodiments of the present invention.

FIG. 2 is a block diagram of data processing systems that illustrate systems, methods, and computer program products in accordance with embodiments of the present invention. The processor 38 communicates with the memory 36 via an address/data bus 48. The processor 38 can be any commercially available or custom microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM, and DRAM.

As shown in FIG. 2, the memory 36 may include several categories of software and data used in the data processing system 30: the operating system 52; the application programs 54; the input/output (I/O) device drivers 58; and the data 56. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 252 by the application programs 54 to communicate with devices such as the I/O data port(s) 46 and certain memory 36 components. The application programs 54 are illustrative of the programs that implement the various features of the data processing system 30 and preferably include at least one application which supports operations according to embodiments of the present invention. Finally, the data 56 represents the static and dynamic data used by the application programs 54, the operating system 52, the I/O device drivers 58, and other software programs that may reside in the memory 36.

As is further seen in FIG. 2, the application programs 54 may include a common format generation 60 and/or a common format analysis module 61. The common format generation module 60 may carry out the operations described herein for converting conventional component status information to situational component status information so as to provide a common formation representation of component status. The common format analysis module 61 may carry out the operations described herein for analyzing situational component status information and may provide additional status information in a common formation representation for further analysis and/or may provide a remedial course or action.

The data portion 56 of memory 36, as shown in the embodiments of FIG. 2, may, optionally, include common format data 62 and/or device specific data 63. The common format data 62 and/or the device specific data 63 may be utilized by the common format generation module 60 to provide the situational component status information and/or by the common format analysis module 61 to provide a common format representation of component and/or system status and/or a suggested remedial course of action.

While the present invention is illustrated, for example, with reference to the common format generation module 60 being an application program in FIG. 2, as will be appreciated by those of skill in the art, other configurations may also be utilized while still benefiting from the teachings of the present invention. For example, the common format generation module 60 may also be incorporated into the operating system 252, the I/O device drivers 58 or other such logical division of the data processing system 30. Thus, the present invention should not be construed as limited to the configuration of FIG. 2 but is intended to encompass any configuration capable of carrying out the operations described herein.

Figure 3:
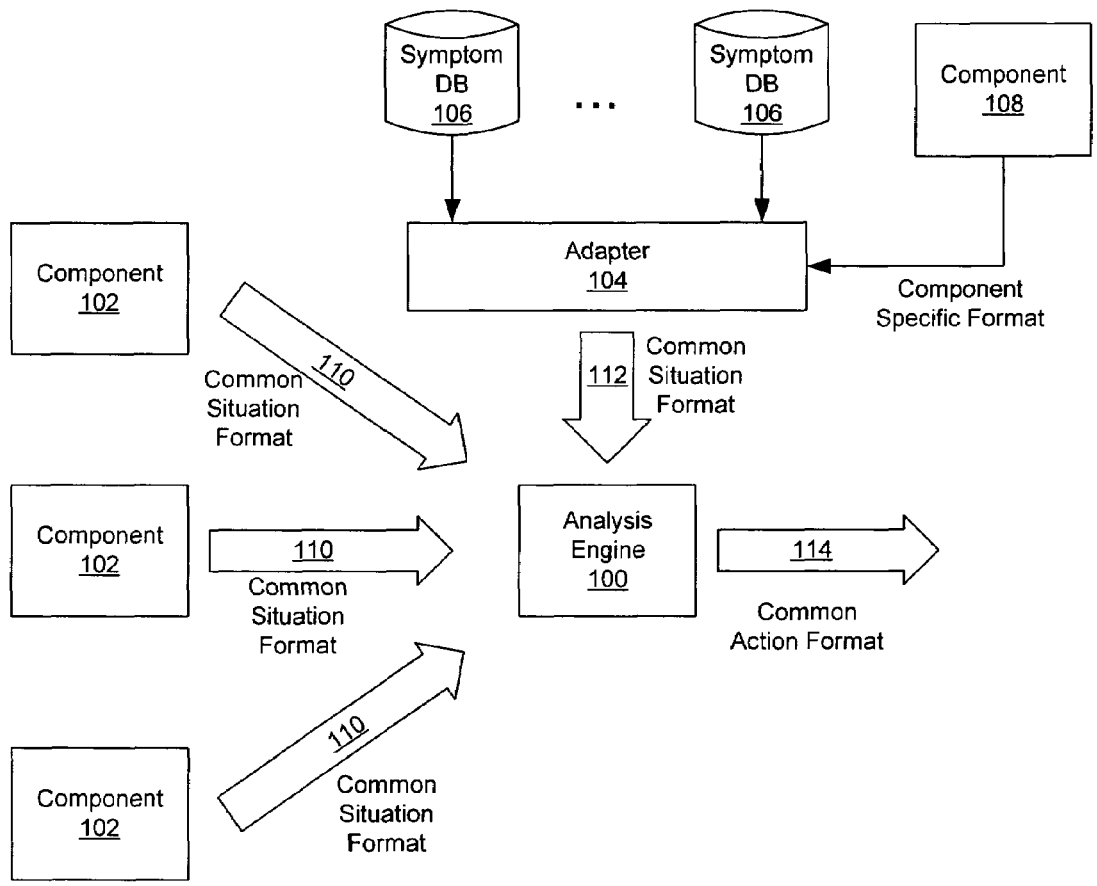
FIG. 3 is a block diagram of a system for monitoring and/or analyzing system status utilizing a situational representation of component status according to embodiments of the present invention.

FIG. 3 is a block diagram of a system incorporating situational representations of component status according to embodiments of the present invention. As seen in FIG. 3, an analysis engine 100 that may, for example, be provided by the common format analysis module 61 of FIG. 2, receives component status and/or system status information in a common situation format. Thus, for example, the components 102, such as applications, middleware, and/or hardware, provide common situation format messages 110 to the analysis engine 100. Similarly, an adapter 104, which may be provided by the common format generation module 60 of FIG. 2, may receive component specific information, for example, from one or more symptom databases 106 and/or a component 108, and convert the component specific format information to the common situation format. The adapter 104 may combine information from multiple databases and/or components into situation information for a component, components and/or a system. The common situation format information may be provided to the analysis engine 100 as a common situation format message 112.

The common situation format messages 110 and 112 may be provided to the analysis engine 100 in real time and/or non-real time. Furthermore, the messages may take any form suitable for communicating the common situation format information. For example, the message may take the form of a datagram(s) from, for example, the components 102 and/or the adapter 104 to the analysis engine 100 to provide real-time or near real-time information. The messages could also take the form of a log file, data stored in memory accessible by the analysis engine 100 or other such technique for communicating information. Thus, the present invention should not be construed as limited to a particular messaging technique but may be used with any technique capable of communicating the common situation format information.

As is further illustrated in FIG. 3, the analysis engine 100 receives the common situation formation messages 110 and/or 112 and, optionally, outputs analysis of the common situation format information as a further common situation format representation or a common action format representation 114 of the results of the analysis. The analysis engine 100 may evaluate the common situation format messages 110 and/or 112 based on a situation category identified in the messages. The messages 110, 112 and/or 114 may take the form of the tuple described with reference to FIG. 4 below. A common action format representation is similar to a common situation format representation, however, the situation category may be replaced with an action category. The action category defines an action to be taken or what needs to be done, whereas the situation category defines status or what has happened. The results of the analysis may be a further characterization of the status or may be an identification of an action to be taken. In either case, the common situation format or common action format may be utilized to provide information about the results of the analysis. Furthermore, the results may be provided by one or more messages or appended messages in the common situation format.

Because the common situation format messages utilize a situational representation of status, rather than a component specific error message, the analysis engine 100 may be based on an analysis of common situations experienced by one or more components. Thus, for example, a symptom database of situations that correlates situational information to specific responses or further situations may be utilized in the analysis engine 100. Furthermore, information from multiple databases may be combined by the analysis engine 100 to result in an action and/or additional situation information. Such a symptom database may be provided, for example, by modifying a conventional symptom database to utilize situational information rather than component specific information. Accordingly, the need to revise the analysis engine as a result of changes in the error reporting of components may be reduced or avoided. Furthermore, the need to customize the analysis engine 100 based on a specific system configuration may also be reduced or eliminated.

Figure 4:
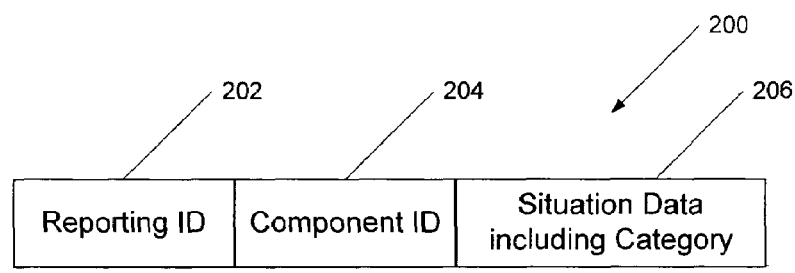
FIG. 4 is a diagram of a tuple that provides situational status and/or actions according to embodiments of the present invention.

FIG. 4 illustrates portions of a common situation format message 200 according to certain embodiments of the present invention. As illustrated in FIG. 4, in addition to or as a substitute for conventional status information in a status message, the common situation format message 200 includes an identification of the component reporting the status (Reporting ID 202), an identification of the component about which the status is reported (Component ID 204) and an identification of the situation category that identifies the status of the component (Situation Category 206). The common situation format message 200 may be utilized to provide data from a variety of heterogeneous sources in a canonical format as a set of canonical semantics (situations). Thus, the situation data including a category 206 may represent a situation associated with a component as one of a predefined set of situation identifications. If the common situation format message 200 is modified to be a common action format message, the situation data including a category 206 may be replaced by situation data that includes an action category which is one of a predefined set of action identifications. The predefined situation identifications may represent the status of a component or system and predefined action identifications may represent an action to be taken. The predefined situation identifications may include, for example, START_SITUATION, STOP_SITUATION, FEATURE_SITUATION, DEPENDENCY_SITUATION, CONFIGURE_SITUATION, CREATE_SITUATION, DESTROY_SITUATION, CONNECT_SITUATION, REPORT_SITUATION, AVAILABLE_SITUATION, REQUEST_SITUATION, and/or CONFLICT_SITUATION.

Figure 5:
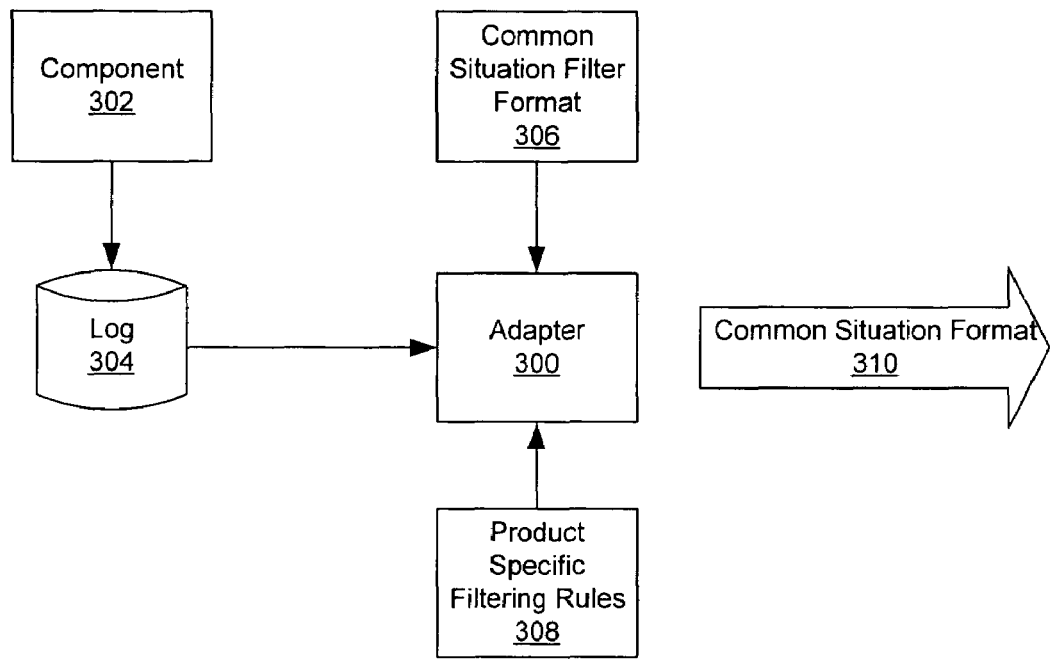
FIG. 5 is a block diagram of a system for converting conventional status information to a situational representation of component status according to embodiments of the present invention.

FIG. 5 illustrates a system for converting component specific information into common situation format. In certain embodiments of the present invention, the system of FIG. 5 may provide the adapter 104 of FIG. 3. As illustrated in FIG. 5, the adapter 300 may obtain component information about a component 302 from a log 304, such as an error log. Additionally, or alternatively, the adapter 300 may receive component information directly from the component 302. The adapter 300 may also obtain or be provided product specific filter rules 308 and/or common situation filter format information 306.

The product specific filtering rules 308 may be used to filter the log files and/or messages so as to categorize one or more error log entries into one of a predefined set of situational categories. For example, the product specific filtering rules 308 may be used to convert from one or more error codes of a component to situations associated with the one or more error codes.

The common situation filter format 306 may be used to specify the common situation format for the common situation format representation 310 provided by the adapter 300. For example, the common situation filter format 306 may specify the use of the common situation format illustrated in FIG. 4. Thus, for example, the reporting ID 202, the component ID 204 and the situation data including a category 206 may be specified by the common situation filter format 306.

As described above, the adapter 300 may provide a common set of data that is collected about situations or events. Thus, the tuple of the identification of the component that is reporting the situation, the identification of the component that is experiencing the situation and an identification of the situation may be provided by the adapter 300. Thus, much of the data for the three tuple need not be obtained from the log 304 and/or component 302 but only data that is useful in the scope to which it is reported need be provided. Accordingly, a reduced amount or minimum amount of data only need be provided by a component and the remainder of the information may be obtained from the context of the message and/or scope of the function receiving or forwarding the information.

For example, for a management function running on a local machine, a component of the machine can report that a drive, such as the "C:" drive has failed. When the component of the machine reports this information, because the receiver of the information is local, "C:" uniquely identifies the failed component. When this information is passed to a management function beyond the bounds of the local machine, the data may be augmented so that a unique identifier for the local machine is added, thus, the failing component becomes "machine1:C:". This augmentation allows for reduced and/or minimal amounts of data to be generated by the component which may increase the performance and/or simplify the operation of the component.

For example, in the system illustrated in FIG. 5, the adapter 300 may augment the information from the log file 304 so as to provide a unique identification within the scope of the system in which the adapter resides. Thus, if the component 302 is a server, such as "ServerA", and the log file 304 is for ServerA, the adapter 300 may augment the data from the log file 304 to add a unique server identification to the identification from the log file. For example, if a process, such as ProcessA on ServerA stops, the log file 304 may only indicate that ProcessA has stopped. However, the adapter 300 may know the context or scope of the log file 304 and generate a component identification of "ServerA: ProcessA" and a reporting identification of "ServerA."

Figure 6:
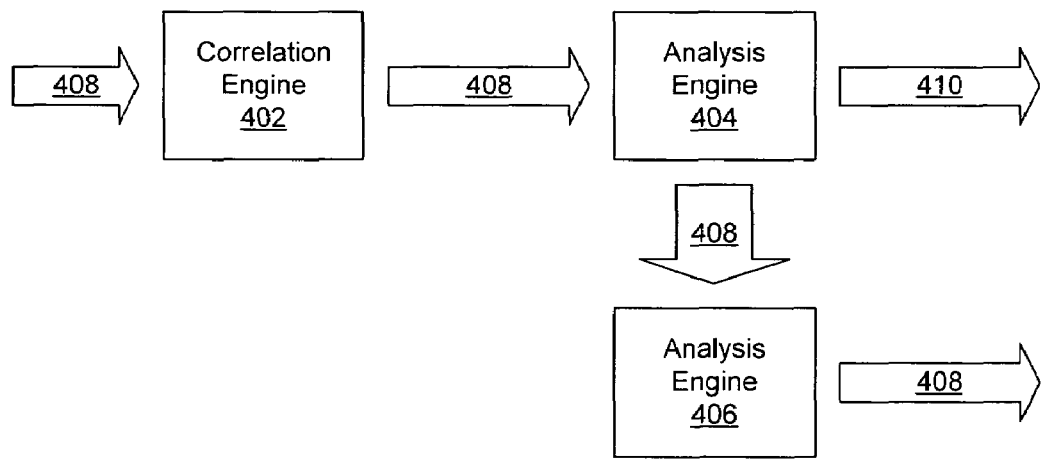
FIG. 6 is a block diagram of a system for analysis of component status information and/or autonomic generation of status and/or actions according to embodiments of the present invention.

FIG. 6 is a block diagram of a system for analysis of component status information and/or autonomic generation of status and/or actions according to embodiments of the present invention. In particular embodiments of the present invention, the system of FIG. 6 provides some or all of the analysis engine 100 of FIG. 3. As seen in FIG. 6, a correlation engine 402 may receive common situation format representations 408 of component status, for example, from a component, such as components 102 of FIG. 3 or from an adapter, such as the adapter 104 of FIG. 3 or the adapter 300 of FIG. 5. The correlation engine 402 determines a correlation between common situation format representations of component status and provides sufficiently correlated ones of the common situation format representations to an analysis engine 404.

The common situation format representations may, for example, be component, transaction and/or time correlated by the correlation engine 404. For example, common situation format representations within a predefined time of an event or other status message may be considered sufficiently correlated and provided to the analysis engine 404 as a correlated set of common situation format representations and/or may be combined into common situation format representation of the correlated common situation format representations. The correlation engine 404 could also correlate common situation format representations based on a transaction associated with the common situation format representations. Thus, common situation format representations associated with the same transaction could be provided to the analysis engine 404.

The analysis engine 404 analyzes the sufficiently correlated common situation format representations of component status and autonomically generates a common situation format representation 408 and/or a common action format representation 410 based on the correlated information. The output of the analysis engine 404 may be a further situational categorization that may, for example, be provided to a subsequent analysis engine 406. The subsequent analysis engine 406 may further analyze the common situation format representation and provide results based on its analysis as a further situation identification that may be further analyzed. The output of the analysis engine 404 and/or the analysis engine 406 could also be an action identification where the action identification is a canonical action identification from a predefined set of action situations as described above.

For example, for situational identifications of START and STOP, the correlation engine 402 may determine a START of component X and a STOP of component Y are correlated and provide the two correlated representations to the analysis engine 404. The analysis engine 404 may determine that "if a START for component X is followed by a STOP for component Y, then take action Z" and may output as a result a common action format representation that indicates that action Z is to be taken. Thus, an action may be automatically generated based on the situational information, rather than component specific status message IDs.

As a further example, if an identified component fails to start because of an unmet dependency, common situation format messages for the failure may be generated. For example, messages of (Component ID, START, UNSUCCESSFUL) and (Component ID, DEPENDENCY, FAILED, Dependent Component ID) may be generated and correlated by the correlation engine 402 based on the common Component ID, a common transaction associated with the messages or a timing of the messages. The analysis engine 404 may then identify the dependency failure as the problem based on the situational information provided and automatically generate messages to an installer that indicate the actions to be taken to remedy the dependency problem. For example, messages of (Component ID, DEPENDENCY, SATISFY, Dependent Component ID) followed by (Component ID, START) may be automatically generated. Such analysis may be provided, for example, by providing a symptom database as described. Such a database may utilize conventional techniques utilized in symptom databases, however, utilizing the situational information provided in embodiments of the present invention rather than the component specific information of a conventional symptom database.

Embodiments of the present invention have been described herein with reference to a particular common situation format. However, the term "common situation format" is used herein in its generic sense and should not be construed as limited to a particular format but is intended to include other formats the utilize situational information to categorize status and/or actions. Thus, for example, additional information may be provided in a common situation format message or multiple messages may be combined to a single message having additional information. Furthermore, multiple situational information may be provided in a single message while still providing a common situation format representation of the status and/or action.

While embodiments of the present invention are described herein with reference to particular systems illustrated in FIGS. 3, 5 and 6, the present invention should not be construed as limited to such systems. Thus, for example, embodiments of the present invention may be provided in a stand-alone application, as part of a component monitoring system or as part of a network monitoring system. Accordingly, the present invention should not be construed as limited to a particular system configuration but may be utilized in any system capable of carrying out the operations described herein.

Figure 7:
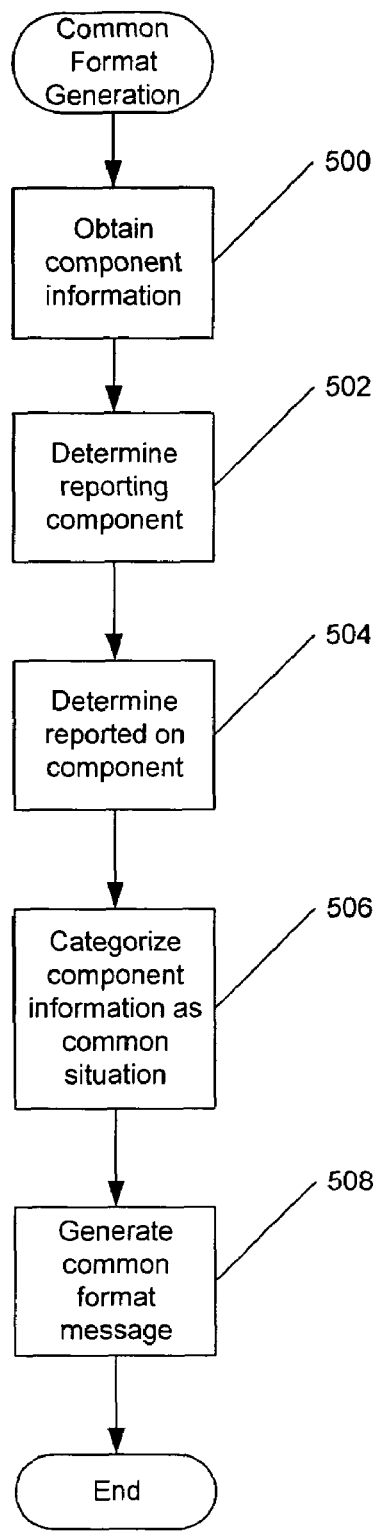
FIG. 7 is a flowchart illustrating operations for converting conventional component status to situational component status according to embodiments of the present invention.

Operations according to embodiments of the present invention will now be described with reference to the flowcharts of FIGS. 7 and 8. FIG. 7 is a flowchart illustrating operations that may be carried out according to embodiments of the present invention for the generation of a common situation format representation of component status.

As seen in FIG. 7, component information is obtained (block 500). As discussed above, component information may, for example, be obtained by receiving messages from a component, inspecting a log file, or other techniques for obtaining component status information known to those of skill in the art. An identification of the component reporting the status is made (block 502) as well as an identification of the component for which the status is reported (block 504). As discussed above such an identification may be either explicit or implicit. For example, the reporting component may expressly identify itself or it may be implied based on the context and/or scope of the reporting and/or receiving component.

The component information is also categorized as one of a predefined set of common situation categories (block 506). Such a categorization may, for example, be provided by a correlation between component specific status codes and the situational categories. For example, an error code of "1234" may be translated to a situational category of "START" for the specific component. Thus, an identification of the reporting and/or reported on component and/or the error code reported may be used to categorize the component information as one of the predefined situations. Additionally, multiple component messages may be combined to determine the situation category. For example, different sequences of error codes may map to different situations.

Utilizing the reporting component identification, the reported on component identification and the situational category, a common situation format message is generated (block 508). The format of the message may be described above or may take different forms that may also convey the tuple of information described above.

Figure 8:
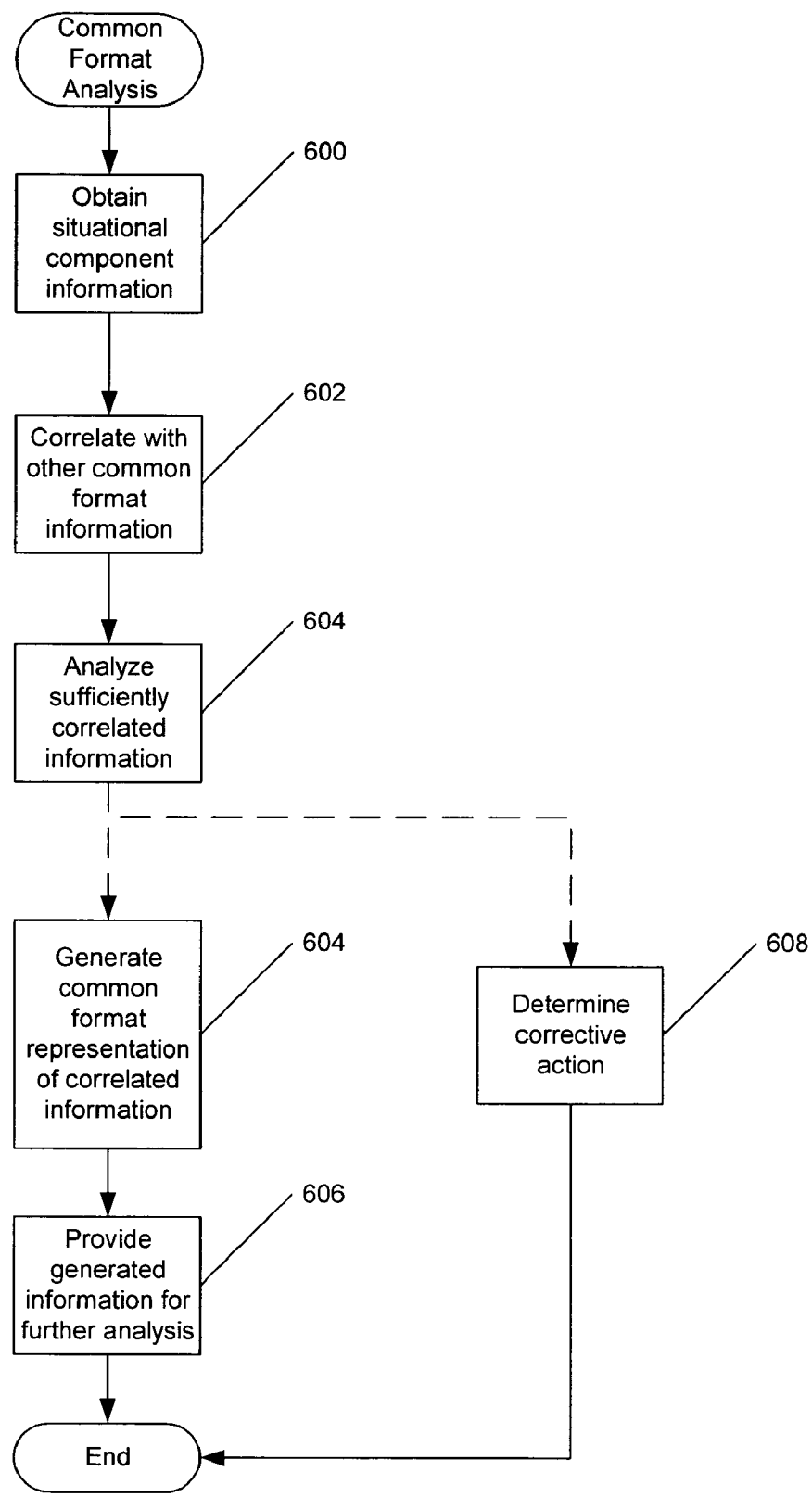
FIG. 8 is a flowchart illustrating operations for analysis of situational component status information according to further embodiments of the present invention.

FIG. 8 is a flowchart illustrating operations that may be carried out according to embodiments of the present invention for the analysis of common situation format representations of component status. As seen in FIG. 8, situational component information is obtained (block 600). The situational component information may be obtained, for example, from a component, such as components 102 of FIG. 3 or from an adapter, such as the adapter 104 of FIG. 3 or the adapter 300 of FIG. 5.

The situational component information may also be correlated with other common situation format representations (block 602). As discussed above, such a correlation may be based on component identification, time and/or transaction. The common situation format information that is sufficiently correlated is then analyzed (block 604). This analysis may, as discussed above, be a comparison of the correlated information to determine further situational information and/or may be performed to determine actions to be taken. For example, the correlated information may be evaluated to determine that the combination of situations reflected in the correlated information indicates the presence of an additional situation. This additional situation may be associated with the components of the correlated information or may be associated with a different component.

Additionally, the combination of components represented in the correlated information may comprise a subsequent component in a hierarchy of components. Thus, for example, if situational information from components of a server are correlated and indicate a failure situation, the failure situation may be associated with the server rather than the individual components. The analysis of the situational information may, therefore, lead to an aggregation of components to identify a higher level abstraction of the components associated with a situation. Such a higher level abstraction may, for example, range from components of a server to networked systems to networks. Accordingly, aggregation may be within a single device or across multiple devices to thereby provide system status of, for example, a network and/or a networked system. Thus, system status (e.g., status of a server) may be generated based on an aggregation of component status (e.g., status of hard drives, network interfaces, applications, processes etc.).

Likewise, the analysis of the situational information may also isolate a component from a group of components based on the situational information for the group of components. For example, situational information may indicate that a server has failed, applications have failed and a hard drive has failed. The analysis may result in determining that the failure of the hard drive is the cause of the other failures and, thereby, generate situational information only for the hard drive and/or indicate that corrective action for the hard drive should to taken.

As is further seen in FIG. 8, if the analysis is to determine additional situational information, then a common situation format representation of the results of the analysis of the correlated information may be generated (block 604) and provided for further analysis (block 606). The analysis may also determine corrective action to be take (block 608) based on the situational information as described above.

The flowcharts and block diagrams of FIGS. 1 through 8 illustrate the architecture, functionality, and operation of possible implementations of systems, methods and computer program products utilizing situational representations of component status according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of monitoring components of a system, comprising:
    associating a status of at least one component of the system with one category of a set of component independent predefined situation categories so as to provide the status of the at least one component in a common situation format that includes the one category;
    analyzing system status based on the common situation format representation of the status of the at least one component; and
    identifying a corrective action based upon the analysis of the system status.

2. The method of claim 1, wherein said associating a status of at least one component is carried out by the at least one component.

3. The method of claim 1, wherein said associating a status of at least one component comprises:
    obtaining a status message from a component;
    classifying the status message based on the contents of the status message so as to identify the one of the set of component independent predefined situation categories; and
    generating a common situation format representation of the status message based on the identified category.

4. The method according to claim 3, further comprising:
    determining a source of the status message;
    determining a component associated with the status message; and
    wherein generating a common situation format representation of the status message based on the identified category comprises generating a common situation format representation of the status message that includes an identification of the source of the status message, an identification of the component associated with the status message and the identified category.

5. The method of claim 1, wherein said analyzing system status based on the common situation format representation of the status of the at least one component further comprises generating a common situation format representation of the system status based on the common situation format representation of the status of the at least one component.

6. The method of claim 1, wherein said analyzing system status based on the common situation format representation of the status of the at least one component further comprises:
    obtaining common situation format representations of status of other components of the system;
    determining correlations between the obtained common situation format representations and the common situation format representation of the status of the at least one component; and
    determining a status of the system based on sufficiently correlated ones of the obtained common situation format representations and the common situation format representation of the status of the at least one component.

7. The method of claim 6, wherein determining correlations comprises time correlating and/or transaction correlating ones of the obtained common situation format representations and the common situation format representation of the status of the at least one component.

8. The method of claim 6, wherein determining a status of the system further comprises:
    evaluating the sufficiently correlated ones of the obtained common situation format representations and the common situation format representation of the status of the at least one component so as to select one of the set of predefined situation categories based on the sufficiently correlated ones of the obtained common situation format representations and the common situation format representation of the status of the at least one component; and
    generating a common situation format representation that includes the selected one of the component independent predefined situation categories.

9. The method of claim 8, wherein generating a common situation format representation that includes the selected one of the component independent predefined situation categories further comprises determining a component identifier for the common situation format representation that includes the selected one of the predefined situation categories based on component identifiers associated with the correlated ones of the obtained common situation format representations and the common situation format representation of the status of the at least one component.

10. The method of claim 9, wherein determining a component identifier comprises aggregating the component identifiers to identify a higher level abstraction component identifier corresponding to the component identifiers and/or isolating one of the component identifiers so as to provide the component identifier for the generated common situation format representation.

11. The method of claim 6, wherein analyzing the status of the system further comprises automatically identifying corrective action based on the sufficiently correlated ones of the obtained common situation format representations and the common situation format representation of the status of the at least one component.

12. The method of claim 11, wherein automatically identifying corrective action further comprises generating a common action format representation of the identified corrective action.

13. The method of claim 1, wherein said analyzing system status based on the common situation format representation of the status of the at least one component further comprises automatically identifying corrective action based on the analysis of the system status.

14. The method of claim 13, wherein automatically identifying corrective action further comprises generating a common action format representation of the identified corrective action.

15. The method of claim 14, wherein the common action format representation of the identified corrective action includes a canonical representation of the corrective action.

16. A method of generating status information for a component, comprising:
  obtaining component specific status information for the component;
  classifying the status information so as to identify one category of a set of component independent predefined situation categories based on the status information; and
  generating a common situation format representation of the status information based on the identified one category.

17. The method according to claim 16, further comprising:
  determining a source of the status information; determining a component associated with the status information; and wherein generating a common situation format representation of the status information based on the identified category comprises generating a common situation format representation of the status information that includes an identification of the source of the status message, an identification of the component associated with the status message and the identified category.

18. The method of claim 17, wherein determining a source of the status information comprises determining a source of the status information based on an explicit identification of the source of the status information.

19. The method of claim 17, wherein determining a source of the status information comprises determining a source of the status information based on an implicit identification of the source of the status information.

20. The method of claim 19, wherein generating a common situation format representation further comprises appending source component identification information to the common situation format representation.

21. The method of claim 17, wherein determining a component associated with the status information comprises determining a component associated with the status information based on an implicit identification of the component associated with the status information.

22. The method of claim 21, wherein generating a common situation format representation further comprises appending associated component identification information to the common situation format representation.

23. The method of claim 17, wherein determining a component associated with the status information comprises determining a component associated with the status information based on an explicit identification of the component associated with the status information.

24. The method of claim 16, wherein obtaining component specific status information for the component, classifying the status information so as to identify the one of a set of component independent predefined situation categories based on the status information and generating a common situation format representation of the status information based on the identified category are carried out by the component.

25. The method of claim 16, wherein obtaining component specific status information for the component, classifying the status information so as to identify the one of a set of component independent predefined situation categories based on the status information and generating a common situation format representation of the status information based on the identified category are carried out by an adapter that obtains information about the component.

26. A system for monitoring components of a system, comprising:
  means for associating a status of at least one component of the system with one category of a set of component independent predefined situation categories so as to provide the status of the at least one component in a common situation format that includes the one category
  means for analyzing system status based on the common situation format
  representation of the status of the at least one component; and
  means for identifying a corrective action based upon the analysis of the system status.

27. A system for generating status information for a component, comprising:
  means for obtaining component specific status information for the component;
  means for classifying the component specific status information so as to identify one category of a set of component independent predefined situation categories based on the component specific status information; and
  means for generating a common situation format representation of the component specific status information based on the identified one category.

28. A computer program product for monitoring components of a system, comprising:
  a computer readable medium having computer readable program code embodied therein, the computer readable program code comprising:
  computer readable program code configured to associate a status of at least one component of the system with one category of a set of component independent predefined situation categories so as to provide the status of the at least one component in a common situation format that includes the associated one category; and computer readable program code configure to analyze system status based on the common situation format representation of the status of the at least one component.

29. A computer program product for generating status information for a component, comprising:
a computer readable medium having computer readable program code embodied therein, the computer readable program code comprising:
computer readable program code configured to obtain component specific status information for the component;
computer readable program code configured to classify the component specific status information so as to identify one category of a set of component independent predefined situation categories based on the component specific status information; and
computer readable program code configured to generate a common situation format representation of the component specific status information based on the identified one category.

* * * * *